United States Patent

[11] 3,607,637

[72] Inventor Robert C. Marshall
 West Avon, Conn.
[21] Appl. No. 788,709
[22] Filed Jan. 3, 1969
[45] Patented Sept. 21, 1971
[73] Assignee Combustion Engineering, Inc.
 Windsor, Conn.

[54] NUCLEAR REACTOR COOLANT FLOW DEVICE
 14 Claims, 3 Drawing Figs.
[52] U.S. Cl. .................................................. 176/61,
 176/40, 176/59
[51] Int. Cl. .................................................. G21c 15/02,
 G21c 15/24
[50] Field of Search ........................................ 176/59, 61,
 66, 67, 68, 73, 40

[56] References Cited
 UNITED STATES PATENTS
3,192,120  6/1965  Campbell .................... 176/61 X
3,215,608  11/1965  Guenther .................... 176/40 X
3,481,832  12/1969  Rickert ....................... 176/61 X Primary Examiner—Benjamin R. Padgett
Assistant Examiner—Roger S. Gaither
Attorneys—Carlton F. Bryant, Eldon H. Luther, Robert L. Olson, John F. Carney, Richard H. Berneike, Edward L. Kochey, Jr. and Lawrence P. Kessler ABSTRACT: A flow-confining arrangement for a nuclear reactor which has a core comprised of a plurality of parallel fuel elements. The core is of the open type wherein the flow surrounds each of the fuel rods. A core barrel surrounds the core and generally confines the coolant flow which is passing longitudinally of the fuel elements. A plurality of seal plates extend transversely from the core barrel to the outer fuel elements of the core. These plates prevent flow through the irregular annular space between the core barrel and the core so as to avoid coolant bypassing the core. A plurality of these plates are at locations intermediate the top and bottom of the core with the spacing between these seal plates being sufficiently smaller so that the coolant flow does not expand in this flow path to flow through all the irregular annular opening. This close spacing assures that the coolant flow is effectively confined to the reactor core not only at the seal plate location but also at the locations intermediate the seal plate. The maximum spacing to perform this function is preferred to avoid the requirement of too many seal plates. These seal plates provide a minimum of neutron-absorbing material near the outer fuel elements of the core thereby increasing the output of these fuel elements and accordingly the overall power capability of the core.

PATENTED SEP 21 1971

INVENTOR.
ROBERT C. MARSHALL

BY E L Kocher

ATTORNEY

NUCLEAR REACTOR COOLANT FLOW DEVICE

BACKGROUND OF THE INVENTION

The invention relates to nuclear reactors and in particular to an apparatus for confining the coolant flow to the core region during its transversal thereof.

It is recognized that the best performance of a nuclear reactor is obtained when the coolant flow is uniformly maintained through the reactor core without excessive bypassing. It is conventional to supply a shroud of plate material which conforms to the outer shape of the core and is spaced closely therefrom. This shroud is supported from a core support barrel which also supports the weight of the core itself through a bottom support structure. The minimum spacing between this shroud and the outer fuel element is dictated by the enthalpy rise of the coolant passing between the outer fuel elements and the shroud. It is also important that the shroud not touch the fuel elements since any contact would extend over a substantial length of the fuel rod leading to overheating and possible burnout of the fuel rod at the location.

The minimum spacing desired cannot be maintained in the conventional shroud since certain fabrication and operational tolerances must be considered. While the shroud is a flat plate, some allowance must be made for possible bowing of this plate during fabrication and during operation. A temperature difference between the support barrel and the shroud occurs, since the core barrel is generally in contact with the incoming coolant while the shroud is in contact with the heated coolant. Heat generation also occurs in the support barrel and the shroud which may be different in each. The temperature difference causes differential expansion. Since the shroud is supported from the core barrel this differential expansion must be absorbed in the structural supports, which are required to be rigid for maintenance of the close tolerance, but inconsistently flexible in order to absorb the differential expansion without overstressing any member.

The conventional shroud being immediately adjacent the outer fuel elements absorb neutrons and lowers the power output of these outer fuel elements. Since the core thermal limits are dictated by other fuel elements located generally in the center of the core, this results in a decrease of the overall power output capabilities of the nuclear reactor.

SUMMARY OF THE INVENTION

In my invention coolant flowing through a nuclear reactor core is caused to flow through the core without excessive bypassing by means of a series of seal plates located in an irregular annular space around the core. These seal plates are fastened to the core support barrel at the outer edge and conformed to the shape of the core at the inner edge. A plurality of these seal plates are located between the extreme ends of the core with the spacing being relatively close so that the main path of flow passing between the outer fuel elements and a seal plate does not substantially expand laterally before reaching the next successive seal plate. At each seal plate location the entire through flow is confined to the area inside the inner edge of the seal plates. At locations between the seal plates, there is a slight expansion in the effective flow path with a slight transverse flow component through the core and a slightly diminished longitudinal flow velocity. The close spacing of the seal plates, however, prevents this velocity from becoming so low as to present burn out problems in the fuel elements.

My invention also contemplates similar use of the seal plates in conjunction with a formed reflector. Such a reflector would have the same general shape as a conventional shroud, but would be removed from the core to an optimum nuclear position where there is the best balance between neutron leakage, absorption and reflection. This reflector may be made of a plurality of separate portions with the core barrel being the flow-confining means. The reflector may in itself be continuous so as to be the flow-confining means, with the seal plates extending inwardly from the reflector. The seal plates would extend inwardly from the formed reflector to locations adjacent the outer fuel elements.

It is an object of my invention to maintain coolant flow within a nuclear reactor core without excessive coolant bypassing.

It is a further object to provide such restraint on the flow without excessive neutron-absorbing material adjacent the fuel elements, which would tend to decrease the power output of the reactor.

It is a further object to provide a flow-restricting device which is simple to construct, requires less minimum tolerance and which can be fabricated with smaller fabrication tolerances, thereby permitting a relatively low maximum bypass flow quantity.

While the conventional shroud is limited in its minimum spacing from the fuel elements by the enthalpy rise of the adjacent channel and the burnout danger of shroud to fuel element contact, the seal plates of my invention are not so limited. Even if the seal plates touch the fuel elements, there is line contact only over a very small length which will not result in burnout of the fuel element. Furthermore, if flow is obstructed even due to actual contact between the seal plates and the outer fuel elements, flow can easily occur around the seal plate due to the transverse flow so that adequate vertical flow is available to cool the outer row of fuel rods above and below the obstructing seal plate. It follows that even where the spacing is such that insufficient flow area is retained to avoid a high enthalpy rise in the outer channel using a conventional shroud, the crossflow obtained provides mixing and therefore equalization of the coolant temperatures in the outer regions of the core.

Since the seal plates are immediately adjacent the core at spaced locations, rather than continuously as in the case of a conventional shroud, there is less neutron-absorbing material near the fuel elements. The absence of such neutron-absorbing material increases the power produced by the normally low power outer fuel elements and hence improves the overall core power distribution. It is estimated that this improvement in overall power distribution would provide a potential increase in core power output of 2 to 3 percent. A secondary nuclear advantage is a potential gain in core reactivity which could result in an enrichment reduction. Calculations have shown that the increase in power output of the outer fuel elements with this improved design provides a 2 to 3 percent increase in the overall reactor power output.

Since each of the seal plates is fastened to the core barrel only, they are free to move vertically at locations immediately adjacent to the core. This is in contrast to the conventional shroud which is restricted in vertical movement by its supporting members. Accordingly, the only force imposed on these seal plates is due to the differential pressure across them, with no vertical forces imposed by thermal expansion differences. This leads to a lower stress level in the seal plates during operation.

Since there is less chance of fuel rod burnout with the seal plates touching the fuel elements and there is less concern with a hot outer channel, the minimum tolerable dimension between the edge of the seal plate and the fuel rods will be less than with the conventional design, thereby permitting a design for less bypass flow. Since no allowance need be made such as that due to the bowing of the conventional shroud due to thermal distortion, fabrication, and pressure differences, the sum total of tolerances which lead to a maximum theoretical space between the outer fuel element and the seal plate is significantly lower than with the conventional design. This lower maximum and average tolerance leads to a more accurate hydraulic design of the nuclear reactor core.

My invention, therefore, provides an arrangement whereby more power can be obtained from a given nuclear reactor core with bypass flow around the core maintained at a low value.

DESCRIPTION OF THE PREFERRED EMBODIMENT

Figure 1:
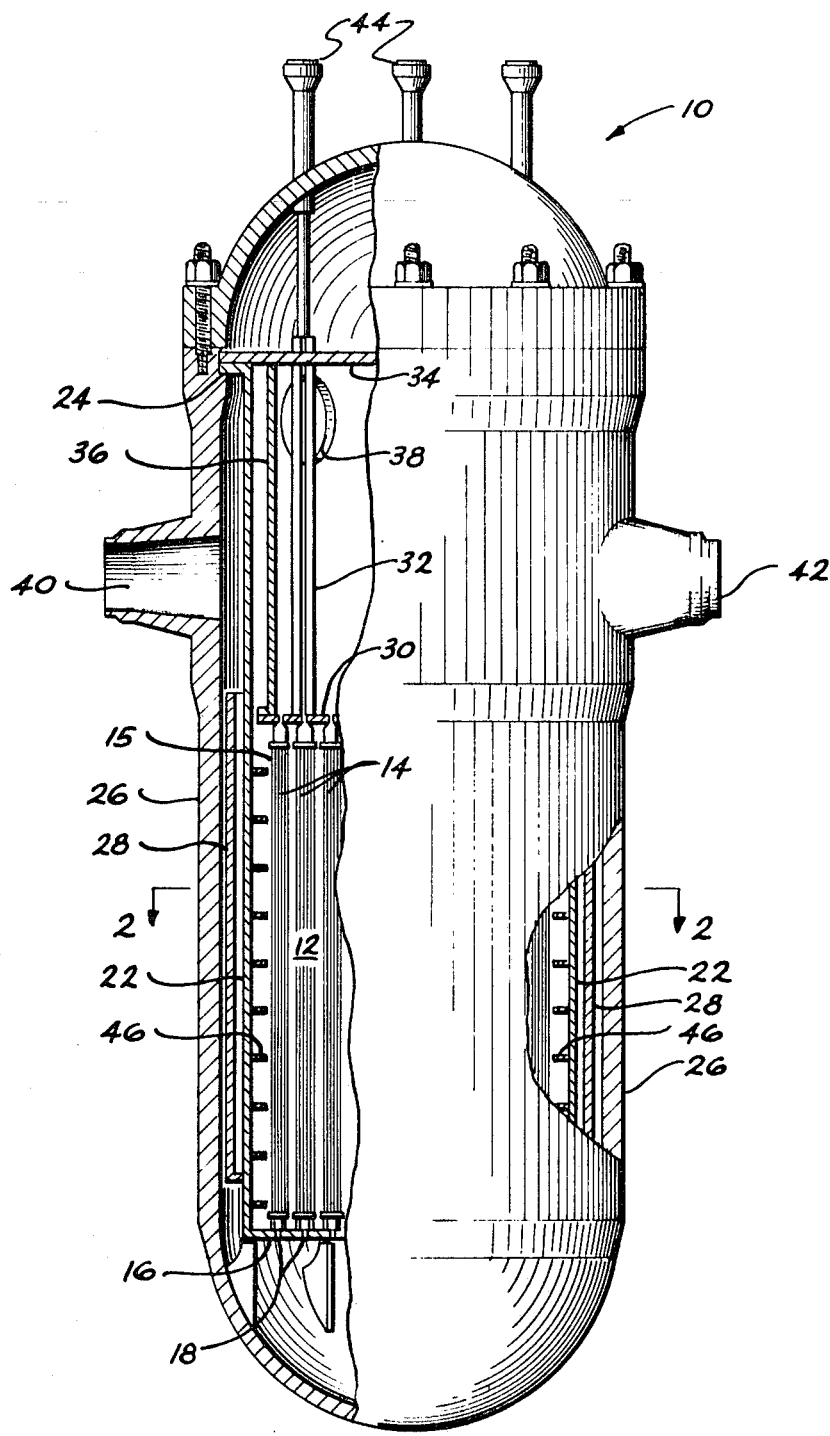
FIG. 1 is a side elevation with partial sections illustrating the general arrangement of a nuclear reactor.
Figure 2:
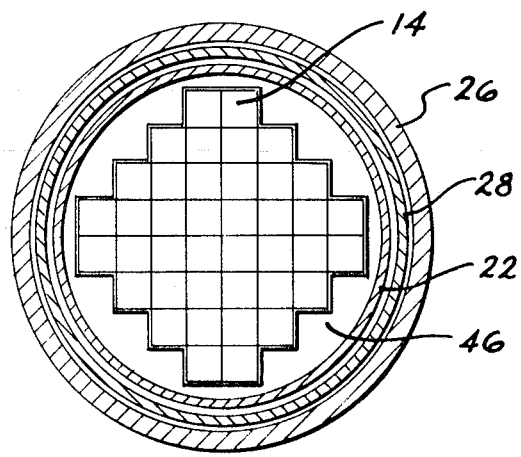
FIG. 2 is a sectional plan view through the core portion of the nuclear reactor illustrating the horizontal arrangement of the seal plates in relation to the core.

Referring first to FIGS. 1 and 2 there is illustrated a nuclear reactor 10 including a core assembly 12 made up of a plurality of fuel assemblies 14. These fuel assemblies 14 are comprised of a plurality of cylindrical fuel elements 15 and supported in position by the lower support structure 16 which has apertures 18 therein for admitting coolant to the reactor core 12. The lower support structure 16 and the entire core assembly is supported by the core support barrel 22 which hangs from the lip 24 on the reactor vessel 26. Located between the core support barrel 22 and the reactor vessel 26 in the region of the core is a thermal shield 28. Located above the fuel assemblies 14 and spaced slightly therefrom is an alignment and holddown plate 30 which aligns the upper ends of the fuel assemblies and prevents the fuel assemblies from being forced upwardly out of position by the reactor coolant and which also supports the control element assembly shrouds 32. The holddown plate 30, which has suitable openings therein for the passage of reactor coolant is suspended from the plate 34 by means of the casing 36. The casing has openings therein such as illustrated at 38 for the passage of reactor coolant.

In operation, the coolant enters inlet nozzle 40 and flows downwardly around the outside of the core support barrel. The coolant then flows inwardly and up through the openings 18 in the lower support plate 16 and flows upwardly through the reactor core 12 wherein the coolant extracts heat. The coolant then flows up through the openings in the holddown plate 30 and outwardly through openings 38 and outlet nozzle 42. The control element assemblies are connected to and driven by the control element assembly drives mounted on nozzles 44.

In order to minimize the maximum enthalpy of the fluid leaving the core, the vertical flow must be confined to the core region with minimum bypass. Instead of the conventional formed plate shroud surrounding the core, seal plates 46 are provided to confine the flow within the core region by intermittently blocking the annular space between the core and the core barrel. These seal plates are fastened in a fluid tight manner to the core barrel 22 and extend transversely of the fuel elements to a location immediately adjacent the outer fuel elements of the core. The edge of the seal plates may be located 10 ml. or less from the outer edge of the fuel elements. This is substantially less than the 140 ml. spacing between the outer surface of adjacent fuel elements within the core region. These seal plates are located at a plurality of elevations throughout the height of the core whereby the flow is effectively confined essentially within the core region.

The close space between the seal plates and the outer fuel elements in the order of 10 ml. can create some problem in inserting the fuel bundles and in generally holding the desired tolerances. Therefore, in many designs it would be desirable to substantially increase this clearance while maintaining sufficient restriction to confine the coolant flow to the core area. A spacing between the seal plates and the fuel elements which is equal to the space between adjacent fuel elements within the core would be reasonable and it is expected that even greater spacing could be tolerated.

Since heat will actually be generated due to neutron and gamma absorption in the seal plates and in the water within the annular space, it may be advisable to place small holes of selected size through the plates at a location adjacent the core barrel or to provide gaps adjacent to the core barrel. This would provide some predetermined flow through the annular area should calculations show that it is required. However, flow tests indicate sufficient movement of water in that area to provide satisfactory cooling of the components and, therefore, fluidtight plates are recommended.

Figure 3:
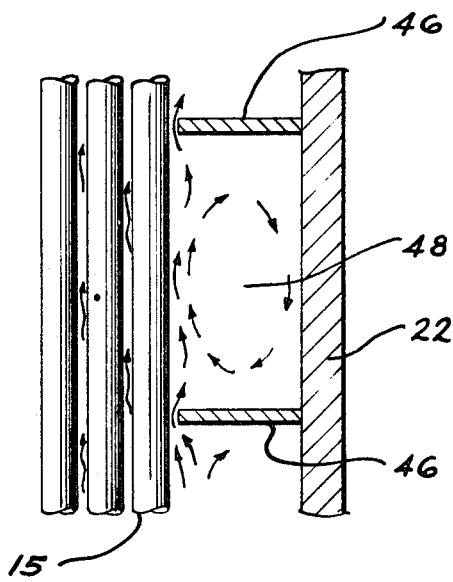
FIG. 3 is a sectional side view of a detail illustration of two successive seal plates and the adjacent fuel elements.

FIG. 3 illustrates the general flow path of the fluid which occurs when the plates are spaced approximately 7 inches apart and 230 ml. from the surface of the fuel elements. It should be noted that the flow first passes inside the lower seal plate 46 and at this time the total coolant flow is confined within the boundaries set by the fuel plate. As the flow passes upwardly, there is only a slight movement in the transverse direction of the flow which passes between the seal plate and the outer tube. Hydraulic tests have shown that within chamber 48 a recirculating motion of the coolant movement is setup so that the path of the actual vertically upward through flow does not fill that chamber. Accordingly, the flow passing along the fuel elements 15 has only a slight transverse movement and the vertical velocity decrease in the core is minimal. If the vertical spacing between plates 46 becomes too great, the flow will expand completely between the vertical plates resulting in an overall velocity reduction through the core at a location between the seal plates with possibility of burnout of some of the fuel elements due to the low velocity.

While the illustrated flow pattern is based on a substantial clearance on the order of 230 ml. between the seal plate and the fuel element is recognized that the same general flow pattern will occur even when a small clearance on the order of 10 ml. is used.

The core as illustrated is of the open lattice type. The mixing effect promoted by the seal plates is maximized with this type core design since the transverse flow can freely occur between any of the fuel elements. In the design of a reactor core with a conventional shroud, the minimum clearance between the shroud plate and outer fuel element is dictated by the enthalpy rise of the fluid flowing through this outside channel. Since mixing is obtained in my invention, the spacing between the seal plate and the outer fuel element may be reduced beyond that normally used.

Maximum effectiveness in confining the flow to the core region is obtained by my invention since, in addition to the smaller minimum clearance between the core and the flow confining member, the tolerances are minimized thereby resulting in a smaller actual constructed clearance. Since the fuel elements are contacted by the seal plates only in a small area in the event of touching there is little danger of burnout and this need not be a design criteria. There is no need to design vertical expansion differences between the core barrel and the shroud and, therefore, no concern with buckling as in the conventional shroud plate. Furthermore, there is no problem with the pressure drop existing between the two sides of the conventional shroud plate. Therefore, the actual design may be made closer to the minimum theoretical design.

In the conventional shroud a substantial amount of material is located immediately adjacent the outer fuel elements. The neutron absorption of this material depresses the output of the outer fuel elements resulting in a lower overall core output. The seal plates of my invention have minimal material close to the outer fuel elements and therefore minimize the neutron absorption. Calculations have indicated that the overall increase of core output of my seal plate design as contrasted to the conventional plate shrouding arrangement is in the order of 2 to 3 percent.

While I have illustrated and described a preferred embodiment of my invention it is to be understood that such is merely illustrative and not restrictive and that variations and modifications may be made therein without departing from the spirit and scope of the invention. For instance while the preferred embodiment described the core barrel as the flow-confining means, other flow-confining means could be used. A reflector formed to the general shape of the reactor core can be arranged at a distance from the core so as to optimize the neutron leakage absorption and reflect thereby still further increasing the overall power capability of the core. This reflector can be the flow-confining means if desired. The seal plates in such an arrangement would extend inwardly from the reflector from a location immediately adjacent the outer fuel elements so as to restrict the flow as previously described. Although some of the previously discussed expansion problems may still be present in such a design, the improved power output may justify dealing with such problems depending on the economics of a particular installation. Such a reflector may also be vertically mounted on the seal plate in the optimum location with the core barrel still being the flow-confining means. I therefore do not wish to be limited to the precise details set forth but desire to avail myself of such changes as fall within the purview of my invention.

What I claim is:

1. A nuclear reactor comprising: a plurality of longitudinally extending parallel fuel elements, said fuel elements being in closely spaced relationship and forming a reactor core; a fluid-confining means surrounding the core and having an opening at each end for the passage of coolant therethrough, an irregular annular space thereby being formed between said reactor core and said fluid-confining means; means for passing a flow of coolant longitudinally of said fuel elements within the confines of said fluid-confining means; and a plurality of longitudinally spaced seal plates fastened to said fluid-confining means and arranged transversely to the fuel elements through the irregular annular space at substantially evenly spaced locations intermediate the extreme ends of the core, said seal plates having the inner edges exposed to and adjacent the outer fuel elements of the core, whereby the longitudinal flow is restricted between the fluid-confining means and the outer fuel elements.

2. An apparatus as in claim 1 wherein said seal plates are impervious and connected in a fluidtight manner to said fluid-confining means.

3. An apparatus as in claim 1 wherein said seal plates have small openings through the locations near said fluid-confining means.

4. An apparatus as in claim 1 wherein said fluid-confining means is a core barrel.

5. An apparatus as in claim 1 wherein said fuel elements are arranged within said reactor core to form an open lattice-type core.

6. An apparatus as in claim 5 wherein said fluid-confining means is a core barrel.

7. An apparatus as in claim 6 wherein said seal plates are impervious and connected in a fluidtight manner to said fluid-confining means.

8. An apparatus as in claim 6 wherein said seal plates have small openings through the locations near said fluid-confining means.

9. An apparatus as in claim 1 wherein the spacing between the inner edge of said seal plates and the outer edge of the outermost fuel elements is less than the spacing between the outer surface of adjacent fuel elements.

10. An apparatus as in claim 9 wherein said fluid-confining means is a core barrel.

11. An apparatus as in claim 9 wherein the spacing between the outer edge of said seal plates and the outer edge of the outer fuel elements is equal to or less than 10 ml.

12. An apparatus as in claim 11 wherein fluid-confining means is a core barrel, and wherein said fuel elements are arranged in said reactor core to form an open lattice-type core.

13. An apparatus as in claim 12 wherein said seal plates are impervious and connected in a fluidtight manner to said fluid-confining means.

14. An apparatus as in claim 12 wherein said seal plates have small openings through the locations near said fluid-confining means.